United States Patent [19]

Neuenschwander

[11] Patent Number: 5,365,021
[45] Date of Patent: Nov. 15, 1994

[54] COREWEIGHING SYSTEM FOR CLOSED-LOOP STOCK GAUGING CONTROL

[75] Inventor: Thomas R. Neuenschwander, Fort Wayne, Ind.

[73] Assignee: L. H. Carbide Corporation, Fort Wayne, Ind.

[21] Appl. No.: 72,504

[22] Filed: Jun. 4, 1993

Related U.S. Application Data

[62] Division of Ser. No. 835,214, Feb. 13, 1992, Pat. No. 5,241,138.

[51] Int. Cl.$^5$ .................. G01G 19/52; G01G 19/40; H02K 15/02
[52] U.S. Cl. .................. 177/50; 177/25.14; 29/598
[58] Field of Search .................. 177/25.14, 50; 29/598

[56] References Cited

U.S. PATENT DOCUMENTS

| | | | |
|---|---|---|---|
| 3,736,997 | 6/1973 | Bottorf | 177/145 |
| 3,995,517 | 12/1976 | Smith | 177/50 X |
| 4,065,911 | 1/1978 | Fagan | 177/50 X |
| 4,136,504 | 1/1979 | Wyslotsky | 177/50 X |
| 4,368,790 | 1/1983 | Ives | 177/50 |
| 4,545,447 | 10/1985 | Spooner et al. | 177/50 X |
| 4,619,028 | 10/1986 | Neuenschwander | 29/598 X |
| 4,738,020 | 4/1988 | Neuenschwander | 29/598 |
| 4,794,996 | 1/1989 | Wallace et al. | 177/50 X |
| 5,109,936 | 5/1992 | Ruppel | 177/25.19 |
| 5,174,009 | 12/1992 | Martin | 29/598 X |

Primary Examiner—George H. Miller, Jr.
Attorney, Agent, or Firm—Baker & Daniels

[57] ABSTRACT

A core conveyor system for electric motor manufacturing apparatus, including a core weighing station for improving the accuracy of stock measurement in manufacturing electric motor stator and rotor laminated stacks or cores from sheet stock. Stock is initially measured to determine a measured stack thickness. The weight of the manufactured stack is used to calculate the thickness of the stock material used. The calculated thickness is used to recalibrate the measured stock thickness. The weight of the stack, if not between a selected maximum and minimum values, determines if the height of the manufactured stack is acceptable. The core conveyor also includes secondary stations for other core manufacturing operations.

6 Claims, 3 Drawing Sheets

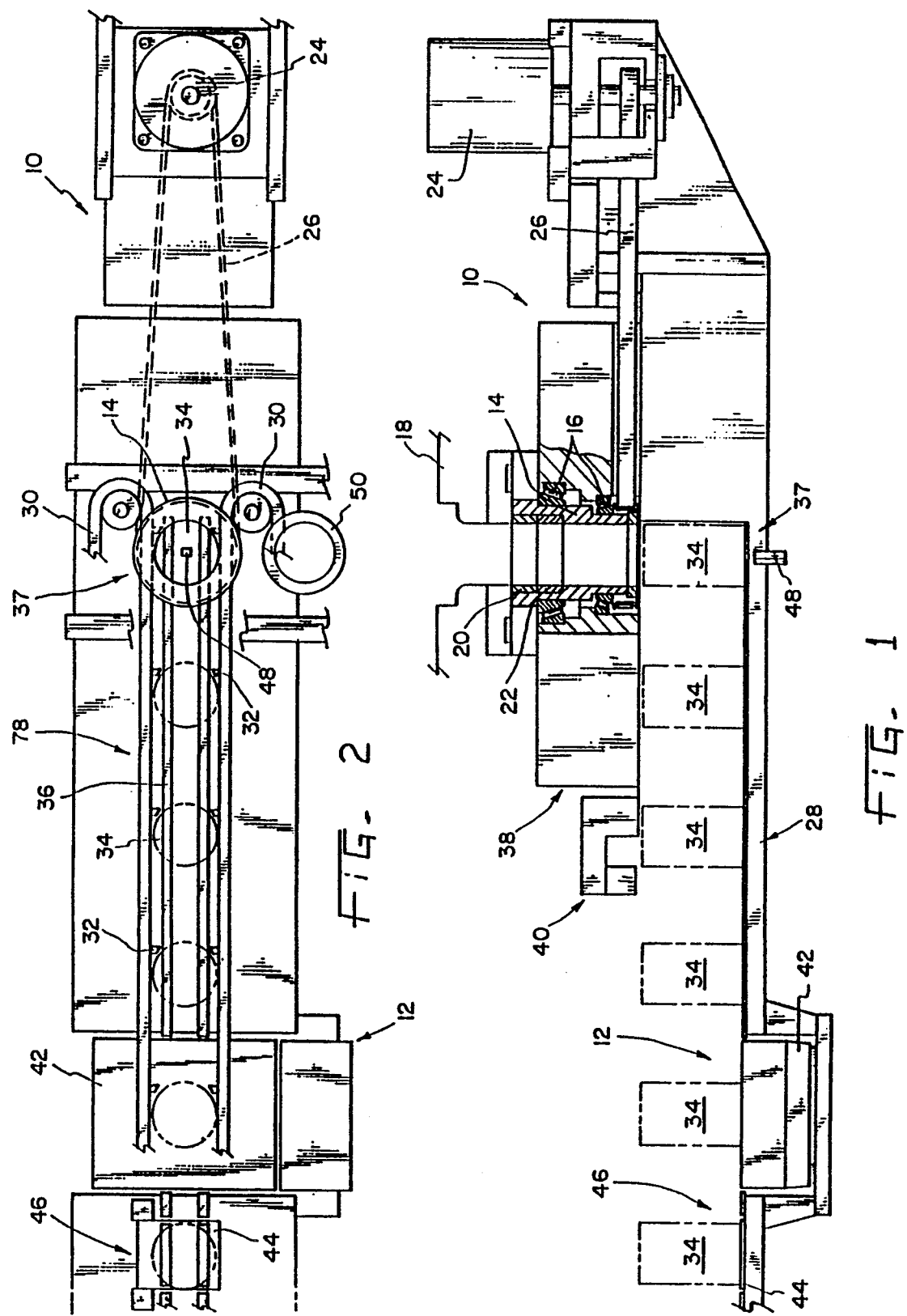

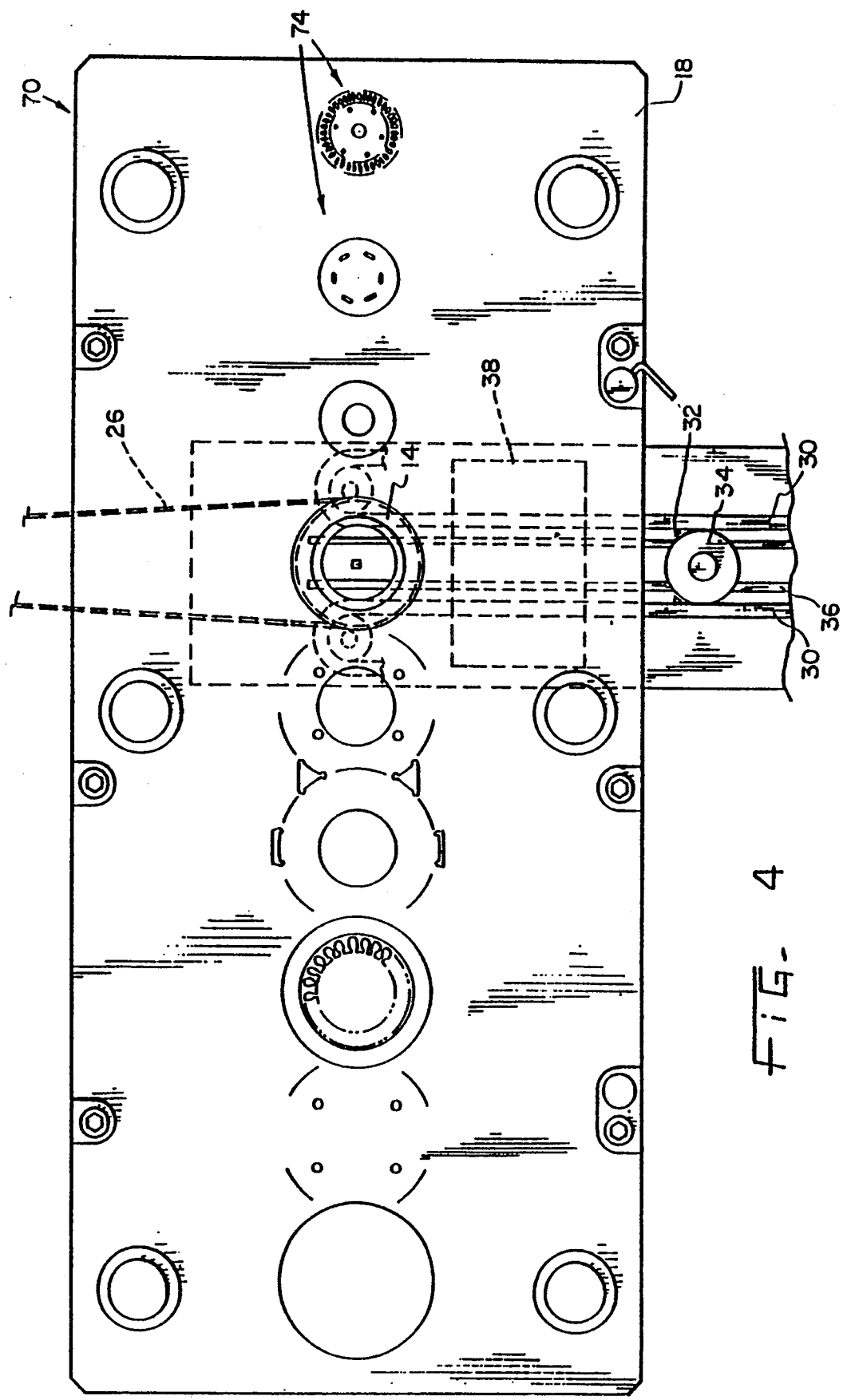

COREWEIGHING SYSTEM FOR CLOSED-LOOP STOCK GAUGING CONTROL

RELATED U.S. APPLICATION DATA

This application is a division of Ser. No. 07/835,214, filed Feb. 13, 1992, now U.S. Pat. No. 5,241,138, Aug. 31, 1993.

BACKGROUND OF THE INVENTION

This invention is in the field of laminated parts and their manufacture and more particularly electric motor or generator rotor and stator stacks and their manufacture.

Laminated rotors and stators manufactured by stacking laminas are well known in the art. Typically, the laminas are blanked from continuous strip stock and are then stacked and interlocked to form the rotor or stator stack, which are referred to as cores. U.S. Pat. Nos. 4,738,020 and 4,619,028 assigned to the assignee of the instant application describe an apparatus and method for manufacturing laminated stacks.

During manufacture of the lamina which are used for preparing the stacks, a device is used to measure the thickness of the strip stock used for construction. A particular problem encountered is with the consistency of the stock readings which, when inaccurate, may lead to errors in a particular direction that will cause the stacked cores to be either too light or too heavy. Even a small error in stock thickness gets compounded by the number of laminas in the stack.

An associated problem is created when a long core is manufactured from a strip stock which is too thick. The stack will be too high and this can damage the core handling apparatus because of the core's extra weight and height. Basically, it is a failure of the equipment to cut the stack off at the proper stack size due to variations of the strip stock material thickness. Manual adjustments, excessive scrap and excessive adjustment time have resulted from inaccurate stock measurements.

SUMMARY OF THE INVENTION

The present invention overcomes the disadvantages of the above described prior art. In a laminating press, the laminas are blanked from a measured, elongated strip of sheet stock for assembly into electric motor parts, such as rotors or stators. The laminas are stacked and interlocked to create a lamina stack or core. After stack construction, the lamina stack is weighed. The average thickness of the laminas in the stack is calculated using the measured weight. This calculated thickness is then used to recalibrate the measurement of thickness of the sheet stock material for use in manufacturing the next lamina stack. In this manner, compensation is provided for errors in measuring sheet stock thickness.

In one form of the invention, the average thickness of the stock material is calculated by dividing the measured weight of the lamina assembly by the product of the number of lamina, the surface area of one lamina, and the density of the lamination material. This calculated stock material thickness is then used to recalibrate the device that initially measured the strip stock material thickness.

In another form of the invention, a decision to scrap a manufactured part may be made by comparing the weighed lamina stack to a specified maximum and minimum weight and rejecting the stack if its weight does not fall between the specific maximum and minimum weight. By comparing the weight of the manufactured core to a maximum and minimum weight, it is possible to direct the disposition of incorrect cores so that under weight cores are directed to a scrap bin while over weight cores may be recirculated onto a separate track or conveyor so that one or more laminations may be peeled off to reduce the weight and therefore the height of the core to acceptable limits. Overweight cores are salvageable as long as their location and problem are identifiable.

In another form of the invention, a core conveyor system is used with an apparatus for manufacturing electric motor lamina cores. The conveyor system includes a conveyor with a motor drivingly connected to the conveyor for moving the constructed lamina cores or stacks. A weighing device is associated with the conveyor for measuring the weight of the transported cores.

An advantage of the core conveyor system of the present invention is that it manufactures cores of proper height.

Another advantage of the core conveyor system of the present invention, according to one form thereof, is that of avoiding errors in stock measurement and detecting cores which have an improper height.

Yet another advantage of the core conveyor system of the present invention is that long cores may be detected thereby preventing damage to the production line.

A further advantage of the core conveyor system of the present invention is that stacks may be manufactured accurately to a height within an error of plus or minus one half of a lamina thickness.

A still further advantage of the core conveyor system is that it allows access to the top of completed cores so that secondary operations such as compressing and labeling may be accomplished.

It is therefore an object of this invention to provide a system for the manufacture of rotor and stator stacks, including a means for compensating for stock thickness measuring errors utilizing the measured weight of the manufactured lamina stack as feedback to the die-press controller.

It is a further object of this invention to provide a system which automatically determines if a lamina stack is within a predetermined weight and therefore a correct height. Stacks not within a predetermined weight are rejected and removed from the production line.

Another object of this invention is to provide a conveyor system with an associated weighing device to accomplish the aforementioned objects.

The invention, in one form thereof, provides a method of manufacturing stacks of electric motor laminas from sheet stock material in a manufacturing apparatus. The method includes measuring the thickness of the sheet stock material and calibrating the apparatus on the basis of the measured thickness to manufacture stacks. The sheet stock material is then guided through a stamping die. A plurality of planar laminas in predetermined configurations are stamped from the sheet stock material, each lamina having an axis substantially perpendicular to the plane of the lamina and each lamina having a predetermined surface area. The laminas are coaxially stacked to form a stack having an axis substantially coaxial with the lamina axis. The completed lamina stack is weighed and the average thickness of the stock material is calculated using the measured weight. The apparatus is recalibrated on the basis of the calculated thickness, determined from the weight, for use in manufacturing a subsequent stack.

In one aspect of the previously described form of the invention, the method further comprises comparing the weighed stack to a specified maximum and minimum weight and rejecting those stacks whose weight does not fall between the maximum and minimum weights. A conveyor system is provided to move the manufactured stack from the location of stacking to the location of weighing the stacks. The average thickness of a stock material is calculated using the measured weight of the lamina stack, the number of laminations in the assembly, the area of one lamination, and the density of the lamination material.

The invention, in one form thereof, provides an apparatus for manufacturing electric motor laminate stacks from sheet stock material. The assembly includes a die with a stamping means for stamping generally planar laminas from the sheet stock material, each lamina having an axis substantially perpendicular to the lamina plane. Each lamina has a predetermined surface area. Stacking means are included for coaxially stacking the laminas to form a stack having a predetermined height with a stack axis substantially perpendicular to the plane of each lamina. The stacking means is operatively associated with the die. Calibration means are connected to said stacking means for redetermining the number of laminas in a stack. Feedback means operatively associated with the calibration means is used to determine the number of laminas by utilizing the weight of the stack. The feedback means includes a scale to measure the weight of the stack.

In one aspect of the previously described form of the invention, the feedback means further includes a conveyor system including a conveyor means for moving the stacks with a motor drivingly connected to the conveyor means. A weighing means is operatively associated with the conveyor means for measuring the weight of the stacks.

The invention, in another form thereof, provides a method of recalibrating an apparatus for manufacturing electric motor laminate stacks of a desired height from sheet stock material. The method includes measuring the weight of a completed laminate stack having a predetermined number of laminations, calculating the average thickness of the stock material with the measured weight, and adjusting the apparatus by substituting the calculated stock material thickness for the measured stock material thickness to adjust the stack laminate count. Alternatively, the adjusting step may adjust the apparatus by finding a difference between the measured stock material thickness and the calculated stock material thickness and adjusting the stack laminate count in relation to the difference to compensate for varying stock material thicknesses so that the laminated stacks are manufactured to a correct height and weight. The method further includes comparing the weighed stack to a specified maximum and minimum weight and rejecting the stacks whose weight does not fall between the maximum and minimum weight.

The invention, in one form thereof, provides a core conveyor system for use with an apparatus for manufacturing electric motor laminate stacks. The system includes a conveyor means for moving the stacks operated by a motor drivingly connected to the conveyor means. A weighing means is operatively associated with the conveyor means for measuring the weight of the stacks. The weighing means transmits the measured weight of the weighed stack to the manufacturing apparatus. In addition, the core conveyor system includes a plurality of stations to where the conveyor means conveys the stacks for secondary operations such as compression, identification, and finishing assembly. A rejection means is incorporated into the core conveyor system for removing stacks whose weight is not within an acceptable range.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 1 is a diagrammatic elevational view of a core conveyor system of a type to which the present invention pertains;

FIG. 2 is a sectional plan view of the core conveyor system of a type to which the present invention pertains;

FIG. 4 is a plan view of a progressive die used in the blanking operation to manufacture laminates.

Figure 3:
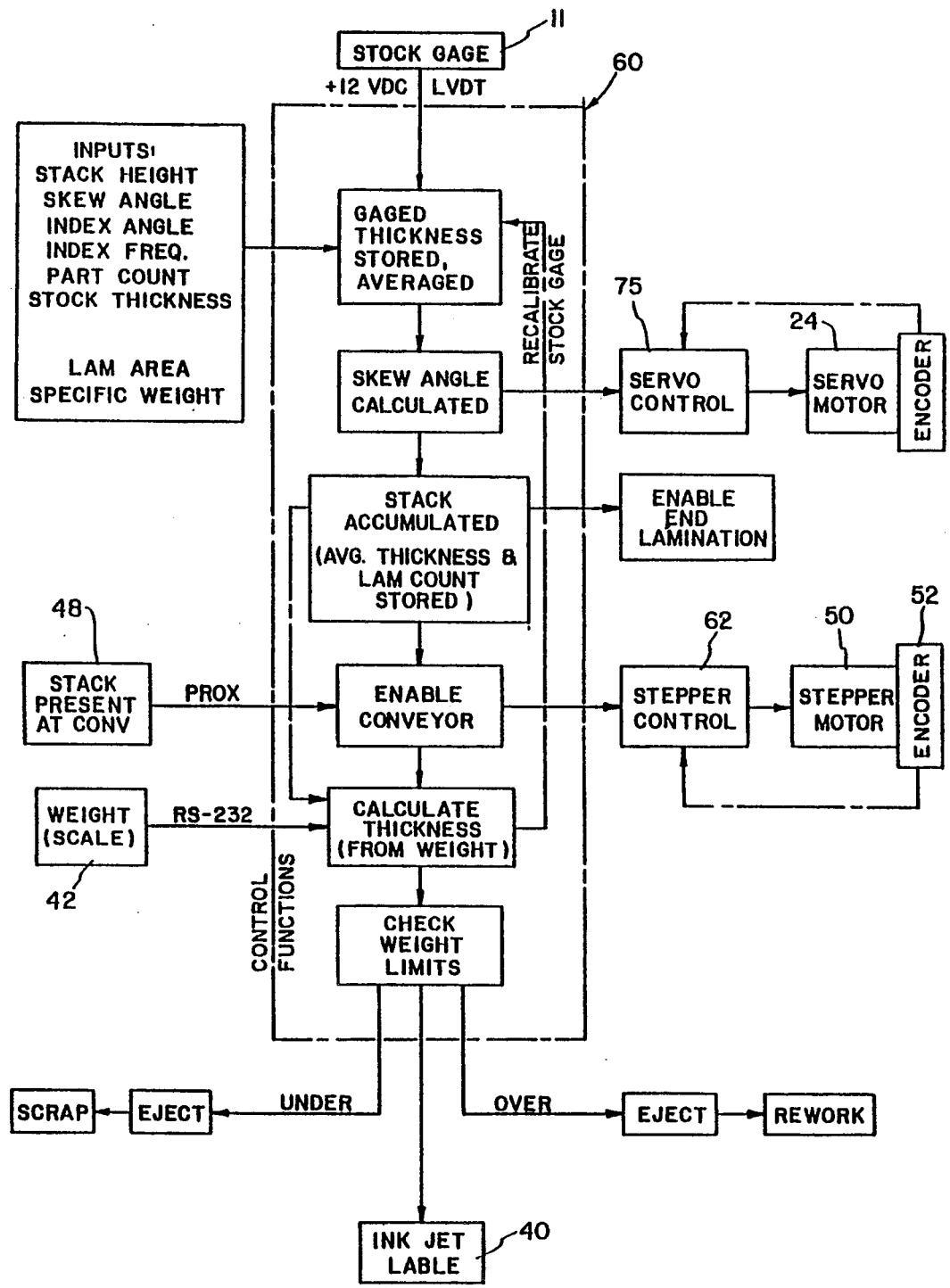
FIG. 3 is a flow chart showing the core weighing system for closed loop stock gaging control of the present invention.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring now to FIGS. 1 and 2 there is shown a core conveyor system 10 with core weighing station 12 to which the core weighing system of the present invention applies. The invention is of particular use with laminating presses for making electric motor rotors and stators having stacked laminas. A rotor or stator lamina stacking system is described in U.S. Pat. Nos. 4,738,020 and 4,619,028 assigned to the assignee of the present application and such disclosure is incorporated herein by reference. These two patents describe in detail an apparatus and method for making laminate parts from sheet stock material which uses stack reversals to eliminate parallelism errors caused by uneven sheet material. Through the use of a progressive die assembly, sheet material is continuously stamped at different stations creating first the rotor and then the stator laminas. In the method and apparatus described in the above identified patents, the operator normally enters the required stack height, skew angle, nominal lamina thickness and skew direction. A machine is used to measure the thickness of the sheet stock material at one or more points to determine either the average material thickness, or the deviation of the sheet material from a perfectly flat stock material.

The present invention improves upon prior methods and machines for manufacturing laminated motor stacks by determining the weight of the finished stack and then calculating the average lamina thickness from that weight. This will become more clear as further described hereinafter. Although described in relation to a core conveyor system, the present invention is not limited to use with a core conveyor system. The invention may be utilized in the construction of rotors, stators, and other laminate parts.

The core conveyor system, as shown in FIG. 1, is associated with die barrel 14 of the core manufacturing machine as shown. Die barrel 14 is mounted on bearings 16. Bearings 16 permit die barrel 14 to rotate relative the laminate parts supplied from die 18. FIG. 4 shows progressive die 18 which may be used with a die press as described in U.S. Pat. No. 4,619,028. Die barrel 14 corresponds to station 6 of the aforementioned patent. Rotation of die barrel 14 along with a stack being built at choke rings 20 and 22, provides the necessary stack reversals as taught in the aforementioned patents. Die barrel 14 is rotated by means of a servo drive system 24 operated by the programmable controller 60 (FIG. 3) operating the associated punch press (not shown). Servo drive system 24 rotates die barrel 14 by means of belt 26.

Core conveyor system 10 includes a conveyor belt 28 and a chain drive 30 having a number of interspaced flights 32 for moving completed stacks or cores 34. Conveyor belt 28 includes a number of stationary wear strips 36 to control stacks 34. Core conveyor system 10 also includes a number of specialized work stations for performing operations upon completed stacks 34. A motor/indexer 50 is drivingly connected to chain 30. One motor/indexer which has been successfully used by applicant is a Compumotor #5106-178-E stepper motor system manufactured by Compumotor Division of Parker-Hannifin Corporation of Rohnert Park, Calif.

As shown in FIG. 1, the first station reached by a completed core 34 after exiting die barrel 14 is compression station 38. After manufacturing, there is normally a certain springiness associated with stack 34. All of the laminas in completed stack 34 are interlocked by tabs mechanically locked into slots, as is known in the prior art, but interlocked stack 34 still displays a certain springiness in the axial direction. Causes of the springiness of completed stack 34 include the waviness of the sheet stock material. Compression station 38 includes a compression means, such as a hydraulic cylinder, controlled by controller 60 to compress stack 34 into a tightly interlocked stack.

Another possible station in core conveyor system 10 is an identification station 40. Station 40 includes an inkjet head or a dot matrix head to imprint upon completed stack 34 information regarding the identity of the tool used, press line, date, stock thickness, stack height, skew angle, and any other desired information about completed stack 34. This provides the ability to identify when and where a particular stack 34 was manufactured and to trace the cause of any defects, such as a bad batch of steel or an incorrectly adjusted punch press. Also it makes inventory on the production floor easier since identification of a particular stack 34 is possible. At times there is no way the naked eye could identify differences between two particular stacks 34.

A key element of the core conveyor system 10 and of the core weighing system is that of core weighing station 12. Weighing station 12 consists of electronic balance 42 suitable for the maximum and minimum weight range of cores or stacks 34 to be produced. The scale utilized may be a top loading laboratory scale, such as an Ohaus GT Series, manufactured by Ohaus Corporation of Florham Park, N.J. which is accurate to 0.05 grams. Electronic balance or scale 42 preferably has a resolution of approximately 0.1 grams or better. This scale 42 will be utilized in the feedback loop of controller 60 described below. Although the core weighing system of the present invention is described using a conveyor belt 28 with a weighing station 12, manual weighing of cores 34 on a scale may also be utilized.

Another station that follows core weighing station 12 on conveyor 28 is rejection station 46. Rejection station 46 includes a trap door mechanism 44 that upon a signal from controller 60, removes a rejected core 34. When trap door mechanism 44 activates, the defective core will fall through an opening to a deflecting baffle (not shown) which will direct the core to either a scrap or rework collection point.

Although described with work stations 38, 40, 12 and 46 in a particular order, these stations may be placed in any order in conveyor system 10, provided that rejection station 46 must be located downstream of weighing station 12.

The programmable controller 60 for the core weighing system and core conveyor system 10 uses the readings from balance 42 for two purposes. If the measured stack weight exceeds either the minimum or maximum permissible weight, controller 60 will actuate trap door 44 at rejection station 46 shown in FIG. 2.

The second and more important purpose for core weighing is to create a closed loop or feedback means in regards to the thickness measurement of the incoming coil stock material. Controller 60, as shown in FIG. 3, will take the measured weight of the stack, and divide it by the number of lamina in that stack, the density or specific weight of the particular lamination material, and then by the surface area of a single lamination. The result is the calculated average thickness of a lamination in a particular stack. For purposes of this invention, this calculated average will be considered the true value of the stock thickness.

The calculated or true value will be compared to the stored average thickness of the measured stock by controller 60 and this differential value will be stored in controller 60. The calculated value of the stock thickness will be substituted for the measured stock material thickness. Alternatively, the differential value, positive or negative, may be added to the thickness readings currently being received from the stock thickness gage 11 effectively recalibrating the measuring unit. One type of thickness gage 11 is described in U.S. Pat. Nos. 4,738,020 and 4,619,028. This comparison or feedback will be performed for each stack 34. Continual feedback from scale 42 thereby confirms or corrects the thickness readings being used to compute the skew angles and stack heights of the respective cores. Qualified cores 34 meeting the specified minimum and maximum weight requirement continue past rejection station 46 to either secondary operation stations or to a finished part collection section (not shown).

In operation, core weighing system and the core conveyor system 10 will operate with prior known apparatuses and methods for manufacturing laminated cores as described in U.S. Pat. Nos. 4,619,028 and 4,738,020. In manufacturing electric motor laminate cores from sheet stock material, the incoming stock will be measured at one or more points along the strip to determine its thickness by stock gage 11. Computations of skew angle, stack reversal, and stack height, and all die control functions, are made as in prior art practice and supplied to die press controller 60 as shown in FIG. 3. New inputs to the controller 60 include the specific weight or density of the sheet stock material and the surface area of a stamped lamina.

The thickness readings for the first stack 34 will be averaged and, on completion, the average thickness will be held in a buffer along with the lamination count for this stack 34. These values must be retained in the controller for a number of stacks in process, normally 1 through 4. The number of cores in process is actually dependent upon the position of the core weighing station 12 in relation to the final station of the punch press i.e. die barrel 14 of the die press as shown in FIG. 4.

The surface area of one lamination is entered into controller 60 to an accuracy of four decimal places. This surface area measurement must be provided for each type of lamina. Controller 60 could retain these for later use by entering an associated part number so that the surface area does not need to be re-entered by hand each time a different lamina type is used. The area of the lamina is equal to the total area of the lamina minus all openings punched into the lamina.

It is necessary to enter a value into controller 60 indicating the density of the coil stock material in either grams or pounds. Normally the value would be 128.52 grams/inches$^3$ for steel.

In operation, the push-through station 37 of conveyor system 10 is immediately below rotating die barrel 14. At the beginning point, chain conveyor 28 is at rest with the flights 32 positioned approximately ¼ inch behind the point at which they will contact core 34. Chain conveyor 28 is stationary until a descending stack or core 34 contacts wear strips 36. The presence of a completed core 34 is sensed by a proximity switch 48 as shown in FIG. 1.

When a core 34 is present at this first stations controller 60 orders stepper motor/indexer 50 connected to chain drive 30 to advance conveyor 28 an appropriate number of counts to achieve the desired progression. The stepper system would be monitored by a load analyzer, preferably integral to stepper motor control unit 62 to stop the process in the event of a conveyor jam. As shown in FIG. 3, an encoder 52 will signal the new position of motor 50. Upon reaching the new conveyor position, the mover/indexer 50 will reverse to a position so that flights 32 are not contacting stacks 34. This will prevent flights 32 from interfering with core 34 descending from die barrel 14 or with other secondary operations as in compression at compression station 38 or weighing at station 12.

The conveyor system can be designed to provide operations to be performed in any desired sequence. Weighing station 12 having electronic balance 42 will be connected to controller 60 by an interface, such as a RS-232 bidirectional interface. As shown in FIG. 3, controller 60 uses the readings from scale 42 for two purposes. If the measured stack weight is not within the acceptable minimum and maximum permissible weight range for a completed stack, the controller 60 will actuate trap door 44 of rejection station 46 when the defective stack reaches that station. The minimum permissible weight is $$A_l(S_i - T_a/2) \cdot D$$

where
  $A_l$ = the area of one lamination;
  $S_i$ = the input stack height in inches;
  $T_a$ = the measured thickness of the stock material; and
  $D$ = the density of the lamination material.

The specified maximum weight of a part or stack is $$A_l(S_i + T_a/2) \cdot D$$

where
  $A_l$ = the area of one lamination;
  $S_i$ = the input stack height in inches;
  $T_a$ = the measured thickness of the stock material; and
  $D$ = the density of the lamination material.

The main purpose for weighing the core is to close the loop on the thickness measurement of the incoming coil stock. Controller 60 takes the measured weight of the stack 34 and calculates the average thickness of the stock material using the formula $$T_c = \frac{W_c/N_l}{A_l \cdot D}$$

where
  $T_c$ = the calculated stock thickness at the scale;
  $W_c$ = the measured weight of the laminate stack;
  $N_l$ = the number of laminations in the stack;
  $A_l$ = the area of one lamination; and
  $D$ = the density of the lamination material.

$T_c$ is considered the true value of the stock thickness and may be substituted for the stored average thickness of the measured stock thereby recalibrating the system. Alternatively, $T_c$ which is considered the true value of the stock thickness is compared to the stored average thickness of the measured stock for the first stack 34. The differential between the calculated thickness and the actual measured thickness, plus or minus, will be added to the thickness readings currently being received from stock thickness gage 11 effectively recalibrating that unit. FIG. 3 shows the flow chart of this recalibration procedure.

As shown in FIG. 3, the recalibration procedure may be internal to the controller 60. At the beginning of the process, inputs of stack height skew angle, index angle, index frequency, part count, and stack thickness are entered into the punch press apparatus controller 60. New information is supplied to the controller 60 comprising the lamina area and the specific weight or density of the sheet stock material (i.e. lamination material) used to make the laminas. A stock gage 11 supplies the value to the controller 60 representing the measured thickness of the sheet stock material. Controller 60 utilizes all of the supply of information and stores the stock thickness for later use. Also with this supplied information, the skew angle necessary for a particular stack is calculated and controller 60 sends a control signal to the servo control unit 25. Servo control unit 25 controls servo motor 24 permitting proper rotation and orientation of die barrel 14.

At this time, controller 60 produces laminas of a predetermined type and accumulates them until a proper height is achieved. At that time, an end lamination is produced and a completed stack 34 drops to station 37. When proximity switch 48 sends a signal to controller 60 identifying that a part has been dropped out of the conveyor, controller 60 will enable the conveyor by sending a signal to the stepper control unit 62 controlling stepper motor 50. Stepper motor indexer 50 will advance conveyors 28 an appropriate number of counts to move completed stack 34 to a designated station.

As soon as completed stack 34 is supplied to weighing station 12, scale 42 will send a value corresponding to the weight of the completed stack 34 to controller 60.

Controller 60 will utilize the weight of completed stacks 34 along with the lamina area, density, and number of laminations in the stack to calculate an average thickness of the sheet stock material. Controller 60 will then feed this value back and will recalibrate the measured thickness previously stored in the memory of controller 60. Controller 60 may substitute the calculated stock material thickness for the measured stock material thickness to adjust the stack laminate count.

After a completed stack 34 has been weighed, controller 60 will determine if the weight of the completed stack is within minimum and maximum limits. If the weight of completed stack is not between the minimum and maximum weight limits, controller 60 will activate trap door mechanism 44 when the rejected stack 34 has reached rejection station 46. If the rejected 34 stack is under weight, the stack will be scrapped. Stack 34 may be reworked if its weight is above the maximum weight limit. As is shown in FIG. 3, additional stack stations such as identified 40 (i.e. inkjet labeler) may be included in the core conveyor system 10 operated by controller 60.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of recalibrating an apparatus for manufacturing electric motor laminate stacks of a desired height from sheet stock material, said method comprising the steps of:

a) measuring the weight of a completed laminate part having a predetermined surface area and number of laminations;
   b) calculating the average thickness of the stock material with said measured weight; and
   c) adjusting said apparatus on the basis of said calculated average thickness to compensate for varying stock material thickness whereby said laminate stacks are manufactured to said desired height.

2. The method of claim 1 wherein said average thickness of the said stock material is calculated using the formula $$T_c = \frac{W_c/N_l}{A_l \cdot D}$$

where
   $T_c$ = The calculated stock thickness;
   $W_c$ = The measured weight of the stack;
   $N_l$ = The number of laminations in the stack;
   $A_l$ = The area of one lamination; and
   $D$ = The density of the lamination material.

3. The method of claim 1 wherein said apparatus includes a stock gage measuring device that measures said stock material thickness.

4. The method of claim 3 wherein said adjusting step comprises determining a difference between said measured stock material thickness and said calculated stock material thickness and adjusting the number of laminas in said stack in relation to said difference.

5. The method of claim 1 wherein said adjusting step comprises using the calculated stock material thickness to adjust the number of laminas in said stack.

6. The method of claim 1 further comprising the steps of:
   comparing said weighed stack to a specified maximum and minimum weight; and
   rejecting stacks whose weight does not fall between said maximum and minimum weight.

* * * * *